United States Patent [19]

Tezuka

[11] Patent Number: 4,509,240
[45] Date of Patent: Apr. 9, 1985

[54] SPRING INSTALLING DEVICE
[75] Inventor: Nobuo Tezuka, Tokyo, Japan
[73] Assignee: Canon Kabushiki Kaisha, Tokyo, Japan
[21] Appl. No.: 375,300
[22] Filed: May 5, 1982
[30] Foreign Application Priority Data
May 14, 1981 [JP] Japan .................... 56-69556[U]
[51] Int. Cl.³ ............................................ B23P 19/04
[52] U.S. Cl. ................................................. 29/227
[58] Field of Search ............... 29/227, 225, 226, 229; 267/137, 155

[56] References Cited
U.S. PATENT DOCUMENTS

| 1,451,708 | 4/1923 | Mitchell | 29/227 |
| 1,816,282 | 7/1931 | Heyner et al. | 29/227 |
| 1,989,171 | 1/1935 | Kohlen | 29/227 |
| 2,670,197 | 2/1954 | Morse | 267/155 |
| 2,750,185 | 6/1956 | Moore | 29/227 |
| 2,755,500 | 7/1956 | Floehr | 267/155 |
| 3,025,594 | 3/1962 | Miller | 29/229 |
| 4,142,283 | 3/1979 | Walker et al. | 29/227 |

Primary Examiner—James L. Jones, Jr.
Attorney, Agent, or Firm—Toren, McGeady and Stanger

[57] ABSTRACT

A device for installing a spring in such a way that a first arm thereof is brought into engagement with an actuator and a second arm is brought into engagement with a fixer to thereby establish exertion of a resilient force between the actuator and the fixer, wherein a step of bringing the first arm of the spring into engagement with the actuator which bears the second arm so that the spring is preparatorily held in an idle state is followed by a step of releasing the second arm from the engagement with the actuator in automatic response to attachment of the actuator to a basic body having the fixer, whereby the second arm is brought into connection with the fixer.

5 Claims, 7 Drawing Figures

SPRING INSTALLING DEVICE

BACKGROUND OF THE INVENTION

1. Field of the Invention

This invention relates to spring installing devices for use in general instruments, and more particularly to a device for installing a spring in such a way that its first arm is brought into engagement with a movable member and its second arm is brought into connection with a stationary member to thereby impart into the movable member a resilient force.

2. Description of the Prior Art

The torsion coil springs used in general instruments are usually set with their first arms acting on movable members and with their second arms fixed in position. When it is desired to install a torsion spring in a prescribed position, the two arms of the spring are brought respectively into engagement with the movable and stationary members directly by hand. In the case of high precision instruments such as cameras, because of limitations on the availability of spaces for access and the flexibility of the assembling process, the points in position of the spring which are allowed to contact (particularly at the fixed arm end) are very restricted. Further, upon consideration of the automation of the assembly line for such instruments and improvements in efficiency and reliability, a necessity arises that the torsion coil spring be of a convenient form for installation (for example, symmetrical). In an alternative which is encountered the spring is first built into a certain unit and then, after the installation of this unit in a main body, it is set to operate. In the process for manufacturing such instruments it has been the conventional practice that the installation of the spring is accomplished as close to the final stage of assembly as possible, or that after a certain subsequent unit has been attached to the basic body, the spring is installed. Another method has also been employed wherein the spring is first built into the corresponding unit, and after this unit has been settled in the prescribed position, one arm of the spring is taken from that unit and brought into connection with a fixer adapted therefor manually. The use of these conventional methods limits the range of possible shapes of the spring, or the degree of flexibility of the arrangement of the spring installing step, thereby resulting in disadvantages in the efficiency of assembly whereby reliability is lowered. For a further advance in the automation of the assembly procedure, the existence of the manual labor at the intermediate stage called "spring setting" prohibits a desirable increase in the productivity.

For example, in the roller carrier supported on the framework or back cover of the camera to press the film against the takeup spool in the past the spring has been mounted as illustrated in FIG. 1. That is, in FIG. 1, a roller carrier 21 rotatably bears a roller 23 at journals 22 formed in portions of the body thereof and is supported at a pivot shaft receptor 25 formed in the opposite side to that having the roller 23. This receptor 25 is fitted on shafts (not shown) provided within the camera housing so that the carrier 21 can pivotally move about the shaft. The carrier 21 is further provided with a torsion coil spring 27 surrounding a shaft 26 in a cutout of the receptor 25 whereby the roller 23 is urged in a predetermined direction when the carrier 21 is mounted in the camera housing. And, the roller 23 is arranged to be always pressed against the convoluted film (not shown) on the takeup spool (not shown) to prevent jamming of the film.

With a spring mounting of such construction, when the carrier 21 is to be built into the camera body (not shown), one arm 27a of the spring is necessarily allowed to project to the full length thereof out of the carrier as the opposite arm 27b lies flat on the surface of the carrier. During the installing operation, therefore, it often happens that the arm 27a of the spring 27 interferes with some of the internal parts of the camera body, thus making the installation difficult. For this reason, it has been the common practice in the art that when assembling the carrier 21 within the camera housing, care must be taken of the adjustment in position of the arm 27a. Thus, there has been encountered a very difficult problem automating the assembly line.

SUMMARY OF THE INVENTION

With the foregoing in mind, an object of the present invention is to provide a spring installing device which enables a movable member to be built into a stationary base very easily, thus overcoming the drawbacks of the conventional device.

Another object of the invention is to provide a spring installing device which is suitably applied to a roller carrying device in a camera.

These and other objects of the invention will become apparent from the following detailed description of embodiments thereof taken in connection with the accompanying drawings.

DETAILED DESCRIPTION OF THE PREFERRED EMBODIMENTS

Figure 1:
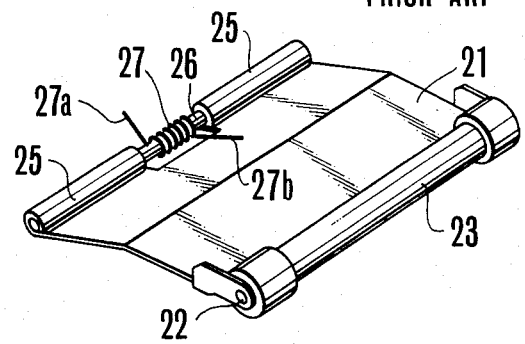
FIG. 1 is a perspective view of the conventional spring mounting device.
Figures 2, 3:
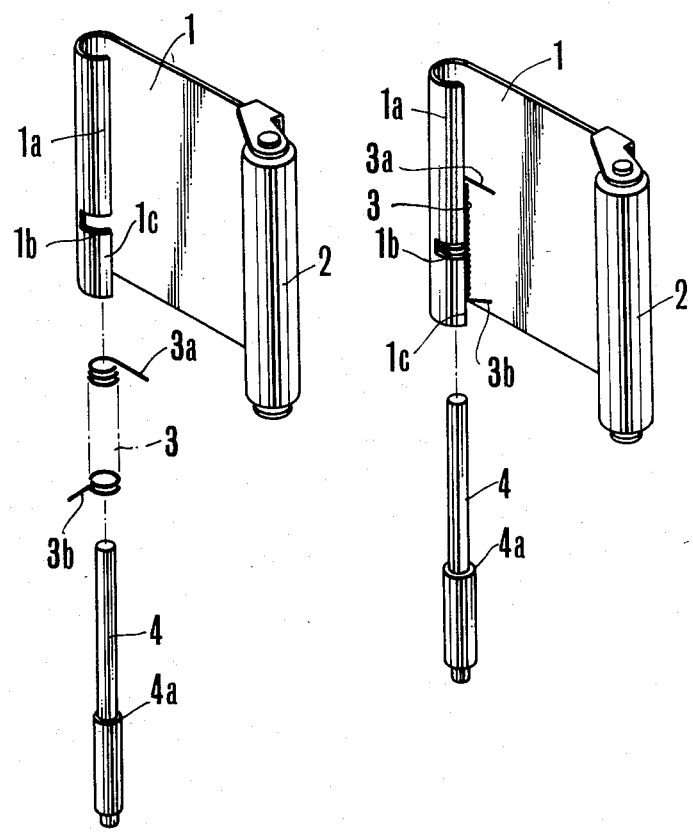
FIG. 2 is an exploded perspective view of an embodiment of a spring installing device according to the present invention.
FIG. 3 is a perspective view illustrating an intermediate stage of installation of the spring of FIG. 2.

FIGS. 2 and 3 illustrate a first embodiment of the invention that is an example of application of the spring installing device of the invention into a film guide roller in the camera.

In the drawings, 1 is a support plate on which a guide roller 2 is journalled; 3 is a torsion coil spring urging the support plate 1 in a counterclockwise direction; 4 is a pivotal shaft for the support plate 1, the shaft 4 being fixed to a camera body 6 to be described later.

The support plate 1 has one side portion at which a guide roller 2 is rotatably mounted and the opposite side portion 1a which is curled to hold the spring 3, its shape being cylindrical with an inner diameter almost equal to the outer diameter of the torsion coil spring. Also, between the edge 1c of the curling portion 1a and the support plate 1 there is a predetermined gap so that when the torsion spring 3 is inserted into the interior of the curling portion 1a, its arms 3a and 3b are guided out of the curling portion 1a. It is also noted that the edge 1c extends almost parallel to the direction in which the spring 3 is inserted.

The first arm 3a of the torsion coil spring 3 always contacts with the side surface of the support plate 1, and the second arm 3b in the position of FIG. 3 engages with the edge of the curling portion 1a. 1b is a cutout groove provided in the periphery of the curling portion 1a in a direction almost perpendicular to the edge line 1c. This cutout groove 1b is for guiding the second arm 3b of the torsion spring 3. The shaft 4 is fitted through the spring 3 in the curling portion 1c of the support plate 1. In this shaft 4, as is understandable from the drawings, there is provided a stepped portion 4a with an upper half cylindrical portion of a smaller diameter than the inner diameter of the torsion coil spring 3 and with its lower half cylindrical portion of a larger diameter than the inner diameter of the torsion coil spring 3.

Figure 4:
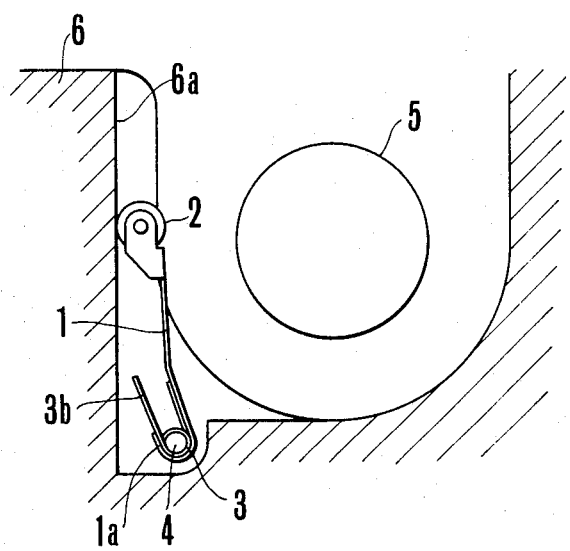
FIG. 4 is a top view, partly in section, of the support plate of FIG. 2 while being built into the camera body.
Figure 5:
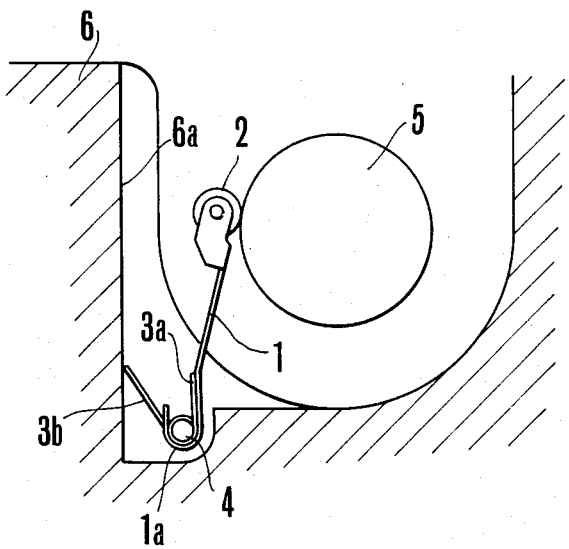
FIG. 5 is a similar view of the support plate of FIG. 2 completely built into the camera body.

In such construction, when the support plate 1 is to be built into the camera body 6 of FIG. 4 so as to establish a predetermined positional relation between the guide roller 2 and a takeup spool 5, at first, as illustrated in FIG. 3, the torsion coil spring 3 is inserted into the curling portion 1a of the support plate 1. Since, at this time, the first arm 3a of the torsion coil spring 3 engages the side surface of the support plate 1, and the second arm 3b of the coil spring 3 engages the edge 1c of the curling portion 1a, no springing force urging the support plate 1 of FIG. 2 to turn about the curling portion 1c fitting on the shaft 4 in the counterclockwise direction is produced. With the support plate positioned within the camera housing 6, as the shaft 4 is being inserted into the curling portion 1a from the lower direction as viewed in FIG. 3, the shoulder 4a of the shaft 4 abuts onthe arm 3b side end of the spring coil 3 and then moves the torsion coil spring 3 in the interior of the curling portion 1c. And, when the second arm 3b arrives at the cutout groove 1b of the curling portion 1a, the second arm 3b turns along the cutout groove 1b from the position of FIG. 4 in a counterclockwise direction and then its end engages the side wall 6a of the camera housing 6 as illustrated in FIG. 5. Therefore, at a point in time when the assembly of the support plate 1 has been completed, it will result in that the support plate 1 is urged to turn about the shaft 4 in a direction toward the takeup spool 5 so that the guide roller 2 is pressed against the outer periphery of the takeup spool 5. For this reason, when a film (not shown) is being wound up on the takeup spool 5, the film will be convoluted on the takeup spool 5 while being prevented from jamming by the guide roller 2.

It is to be noted that since the shaft 4 has to be fixed to the camera housing 6, the shaft 4 may be first fixed to the camera housing, and then the support plate 1 is moved along this shaft. Even in this case, in a similar manner, the torsion coil spring 3 may be installed in the camera housing 6. It is also to be noted in this connection that it is better to employ an arrangement such that just before the support plate 1 reaches the prescribed position, the second arm 3b is released from the preparatory connection with the edge 1c.

That is, in this embodiment, the support plate 1 constitutes an actuator, and the camera housing constitutes a stationary fixer. When the support plate 1 is not as yet installed in the prescribed position in the camera housing 6, the spring 3 is kept in the idle state. Then, when the support plate 1 is installed in the prescribed position within the camera housing 6, the spring 3 is automatically rendered operative.

Figure 6:
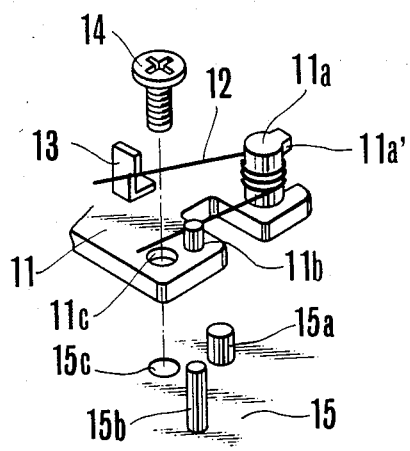
FIG. 6 is a perspective view illustrating another embodiment of the invention.
Figure 7:
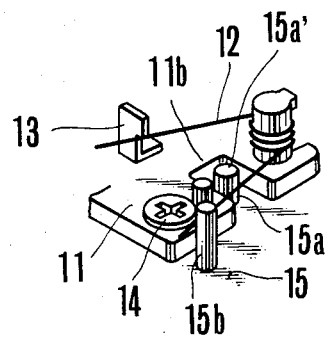
FIG. 7 is a perspective view of the spring of FIG. 6 when installed.

FIGS. 6 and 7 illustrate a second embodiment of the present invention. This represents another example of application of the spring installing device of the invention to a different part to that described in connection with the aforesaid first embodiment. In the drawings, 11 is a unit base plate having a spring supporting portion 11a for supporting a coil spring 12, and a projected portion 11b on which one arm of the torsion coil spring 12 is temporarily engaged, with a screw fastener being fitted in a hole 11c for fixedly securing the unit base plate 11 to a main body 15. Also, the spring supporting portion 11a is provided at its top with an overhang 11a' to prevent the spring 12 from being slipped from the supporting portion 11a. A lever 13 is provided on the base plate 11 to freely act as it engages the opposite arm of the torsion spring 12 to receive a bias force.

In this manner for the torsion coil spring as illustrated, it is desired in many cases that its arms have lengths equal to each other thereby obviating the necessity for insuring a particular orientation of the spring on the assembly line, and enabling the springs to be manufactured more economically. But, in a case where the spring has a symmetrical form, there is a high possibility of encountering situations where the end portions of the spring interfere with other parts because of their layout. For example, as illustrated in FIG. 6, the interference occurs at the hole 11c when the screw fastener 14 is inserted therein. Also, even when the arms of the spring are not the same in length, there is a situation arising from the limitations on its angular range of action and the assembling process that before the base plate 11 is mounted on the main body 15 the spring 12 is put on the base plate 11, and, after the base plate 11 is mounted on the main body, the spring 12 has to be set with its one end engaged on a spring abutment 15b.

In any of the cases described above, one of the ends of the spring 12 must be manually brought into connection with the spring abutment 15b on the main body 15. Therefore, it is impossible to avoid complications in the assembly procedure and lessened reliability.

On this account, according to the present invention, the base plate 11 is provided with the projected portion 11b to permit one of the arms of the torsion coil spring 12 to be temporarily kept thereon before the base plate 11 is mounted on the main body 15, while the opposite arm of the spring 12 is in engagement with the lever 13. Further there are provided on the main body 15 side a true spring abutment 15b and a projection 15a. With the device of such construction, when the base plate 11 of FIG. 6 is being installed on the main body 15, the one of the arms of the spring 12 which has so far been engaged on the projected portion 11b is pushed upwards by the top face 15a' of the projection or pin 15a and is finally released from the connection therewith. Therefore, that arm is turned by the inherent elastic force of the spring in a counterclockwise direction to engage on the spring abutment 15b provided in the main body 15. It is to be noted here that the height of the projection or pin 15a is pre-adjusted so that when the base plate 11 is mounted on the main body 15, the one arm of the torsion coil spring 12 runs over the top of the projected portion 11b, or to be almost equal to or slightly longer than the height of the projected portion 11b measured from the surface of the main body 15. This makes it possible to avoid interference of the spring arm with the hole 11c, thus allowing for the screw fastener 14 to be set.

In the second embodiment described above, the lever 13 constitutes an actuator, the base plate 11 constitutes the preparatory fixer and the main body 15 constitutes the true fixer, whereby provision is made for temporarily keeping the arms of the spring 12 out of contact with the main body 15 while the base plate 11 is being inserted into the main body 15. When it is seated, the spring arm is automatically brought into connection with the main body 15.

As has been described above, the present invention operates to release the spring from the preparatory connection in response to assembling of the actuator with the stationary body. Therefore, the assembling operation is not caused to become difficult by the influence of the resilient force of the spring, and it is not necessary to bring the spring into the normal position manually after the assembling operation. With this, according to the present invention, the complexity of the assembly line can be remarkably reduced and the accuracy and reliability of automatic assembling can be also greatly increased. Particularly in the field of the art of high precision instruments such as cameras having many complicated parts in a narrow space a great advantage can be expected from the invention.

Though the foregoing embodiments have been described in connection with the two cases where both of the arms of the spring are first engaged on the actuator and where one of the arms of the spring is engaged on the actuator and the other arm on the temporary stationary member, so that the spring is kept in an idle state and in a preliminarily active state respectively, and so that when the actuator or the preparatory fixer engaging the spring is installed in the prescribed position, the spring is also installed into its operative position it is to be understood that the present invention is not confined thereto. For example, it is also possible that the arms of the spring are both engaged with a common stationary member to keep the spring in the idle state, and, when this stationary member is installed in the prescribed position, the spring is then rendered into an operative position.

While specific embodiments of the invention have been shown and described in detail to illustrate the application of the inventive principles, it is to be understood that the invention may be embodied otherwise without departing from such principles.

What is claimed is:

1. A device for installing a spring having a first arm and a second arm adapted to develop a resilient force between a first member and a second member by having said first arm of said spring engaged with said first member and by having said second arm of said spring engaged with said second member, comprising:

holding means for holding said spring in freely movable relation in a direction in which said first member is attached, said holding means being provided at said first member and having a cylindrical shape with a diameter almost equal to the outer diameter of said spring;

engaging means engageable with said second arm of said spring, including release means for releasing said engagement when said spring moves to a direction in which said first member is attached, said engaging means being formed as an end part of said holding member along with the direction in which said first member is attached, and a shaft adapted to be fitted in said spring when said first member is attached to said second member, said shaft consisting of a portion having a smaller diameter than the inner diameter of said spring and a portion having a larger diameter than the inner diameter of said spring, said shaft being fixed to said second member.

2. A device according to claim 1, wherein said holding means is formed by bending one end of said first member to a circular shape.

3. A device according to claim 1 wherein said first member is supported on said shaft in a pivotal relation.

4. A spring installing mechanism for automatically installing a spring between two members comprising:

a spring member having a first arm and a second arm and exerting a resilient force between said first and second arms thereof;

a first member to which said spring member is mounted, said first member including a first engaging portion for engagement with the first arm of said spring member, a second engaging portion for engagement with the second arm of said spring member, said second engaging portion holding said spring member in a resilient force-charged position against said first engaging portion and having a movement allowing area of a prescribed length along which said second arm is movable in a direction at least approximately perpendicular to the direction in which said spring member is moved to said force-charged position, said second arm traveling along said movement allowing area while being maintained in said force-charged state; and a releasing portion for releasing said second arm from engagement with said second engaging portion, said releasing portion being contiguous to said movement allowing area so that when said second arm has moved beyond said movement allowing area to said releasing portion said second arm is released from engagement with said second engaging portion by the resilient force of said force-charged spring member;

a second member to which said first member is mounted, said second member being provided with a third engaging portion for engagement with said second arm at a position such as to confront said releasing portion when said first member has been mounted at a regular position of said second member; and a pushing member for pushing at least one of said spring member and said second arm of said spring member to move said second arm to said releasing portion, said pushing member operating in such a manner that while said first member is mounted on said second member at the regular position, said second arm is disengaged from said second engaging portion and is made to engage said third engaging portion thereby to install said spring member automatically between said first member and said second member.

5. A mechanism according to claim 4, wherein said pushing member is arranged to be stationary relative to said second member.

* * * * *